No. 740,663. PATENTED OCT. 6, 1903.
H. KRANTZ.
ELECTRICAL OUTLET BOX.
APPLICATION FILED MAY 25, 1903.
NO MODEL.
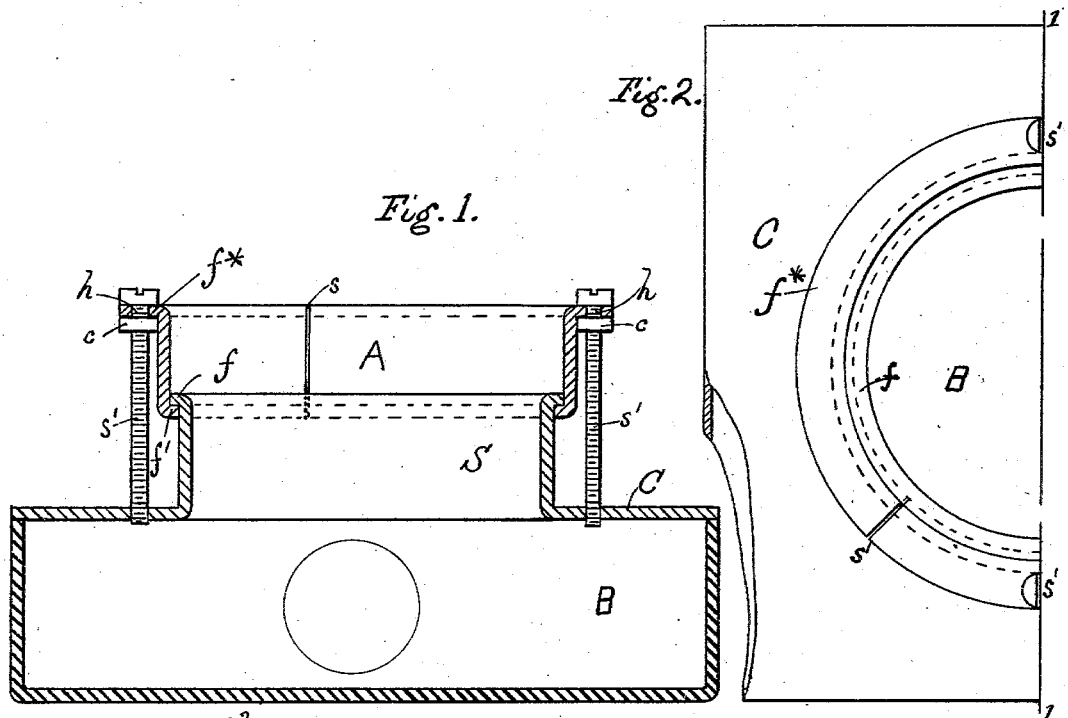
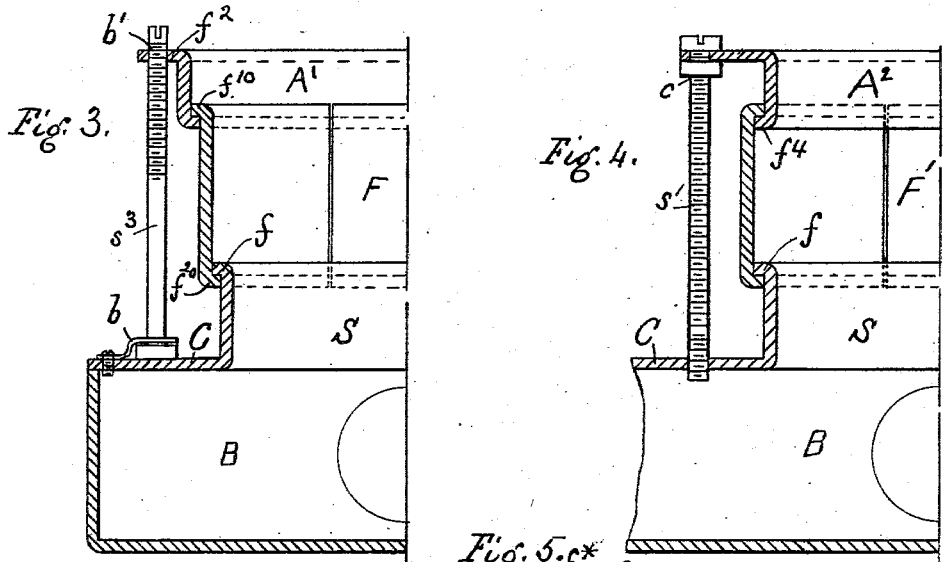
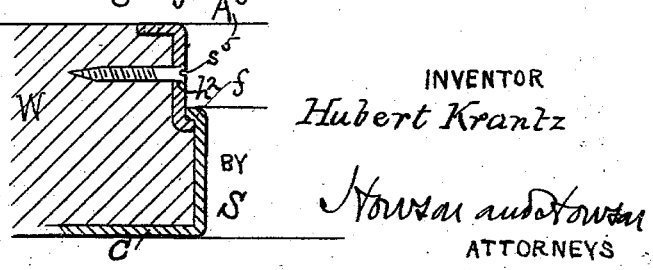
WITNESSES
O. W. Wright
Walter Abbe
INVENTOR
Hubert Krantz
BY
Howson and Howson
ATTORNEYS No. 740,663. Patented October 6, 1903.

UNITED STATES PATENT OFFICE.

HUBERT KRANTZ, OF NEW YORK, N. Y.

ELECTRICAL OUTLET-BOX.

SPECIFICATION forming part of Letters Patent No. 740,663, dated October 6, 1903.

Application filed May 25, 1903. Serial No. 158,702. (No model.)

*To all whom it may concern:*

Be it known that I, HUBERT KRANTZ, a citizen of the United States of America, residing in the borough of Brooklyn, county of Kings, State of New York, have invented Improved Electrical Outlet-Boxes, of which the following is a specification.

The main object of my invention is to provide a simple and efficient electrical outlet-box the face of which can be readily adjusted toward or from the body of the box as the particular place of use may require, and this without interfering with the wires in the interior of the box. This object is attained by the construction which I will now describe.

In the accompanying drawings, Figure 1 is a central sectional view on the line 1 1, Fig. 2. Fig. 2 is a plan of half of the box of Fig. 1. Fig. 3 is a vertical section of half a box, showing a sleeve in two sections. Fig. 4 is a similar view of a modification. Fig. 5 is a view of a manner of securing the adjustable sleeve in place.

As shown in Figs. 1 and 2, B is the outlet-box, which has a cover C, formed with a projecting sleeve S, having an outwardly-bent flange $f$ at its rim. A is the adjustable sleeve embracing the sleeve S and having an inwardly-bent flange $f'$ at its lower end and an outwardly-bent flange $f^*$ at its upper rim. The sleeve A is split, as at $s$, so that it may be sprung over the flanged rim of the box-sleeve S. Holes $h\,h$ may be provided, through which screws $s'\,s'$ freely turn, their lower ends being threaded into tapped holes in the cover C. Nuts $c\,c$ on the screws act as collars, between which and the screw-head the flanged rim of the sleeve A is held.

In Fig. 3 the sleeve A' is connected to the sleeve S of the box by a split flanged section F, having an upper flange $f^{10}$ outwardly bent and a lower flange $f^{20}$ inwardly bent and adapted to be sprung open to encircle the flange $f$ of the sleeve S. The screw $s^3$ in this instance is threaded through a tapped hole $h'$ in the flanged rim $f^2$ of the sleeve A and may be held to the cover C by a claw $b$, so as to be free to be turned.

In Fig. 4 the intermediary section F' is flanged inwardly at both ends, while the sleeve $A^2$ is flanged outwardly at its lower rim $f^4$. Thus the section F' is sprung over the flange of the sleeve S and the flange of the sleeve $A^2$. The means shown for securing the parts in adjusted positions are the same as in Fig. 1.

In Fig. 5 instead of the screw passing through the flange of the sleeve $A^3$ and being secured to the box, as in the prior figures, a hole $h^2$ is formed in the side of the sleeve and a screw $s^5$ passed therethrough and fastened into the wall or floor W.

With the constructions described I secure in a simple way ample adjustment for all practical purposes and without liability of interfering with the wires in the box. In constructions in which sleeves entering the box are employed these sleeves are liable to interfere with the wires.

I claim as my invention—

1. An outlet-box for electrical conductors having a cover with projecting sleeve, an adjustable sleeve freely fitting over the projecting sleeve and outside the box, and adjustable thereon.

2. An outlet-box for electrical conductors, having a projecting sleeve, an adjustable sleeve fitting freely outside the projecting sleeve and screws secured to the adjustable sleeve and to the box to hold the sleeve in adjusted position.

3. An outlet-box for electrical conductors, having a projecting sleeve, an adjustable sleeve, flanges on adjacent edges of both sleeves, the flange of the adjustable sleeve fitting outside the projecting sleeve and adapted to abut against the flange of the projecting sleeve to prevent its removal from said projecting sleeve, substantially as described.

4. An outlet-box for electrical conductors, having a projecting sleeve with an outwardly-flanged upper rim and a split adjustable sleeve having an inwardly-flanged lower end fitting below and outside the flange on the projecting sleeve, substantially as described.

5. An outlet-box for electrical conductors, having a projecting sleeve with an outwardly-flanged upper rim and a split adjustable sleeve having an inwardly-flanged lower end fitting below and outside the flange on the projecting sleeve, and means for holding the adjustable sleeve in its adjusted position.

6. An outlet-box for electrical conductors, having a projecting sleeve with an outwardly-flanged upper rim and a split adjustable sleeve having an inwardly-flanged lower end, fitting below and outside the flange on the projecting sleeve, a screw secured to the adjustable sleeve to hold it in adjusted position.

7. An electrical outlet-box, having a cover, a sleeve projecting therefrom having a flanged end and an adjustable sleeve having an inwardly-bent flange on its lower end and an outwardly-bent flange on its upper end, and fitted on the outside of the projecting sleeve, and a screw between the outwardly-bent flange and the box-cover, substantially as described.

8. An electrical outlet-box, having a projecting sleeve and a number of adjustable sections, all of as great a diameter as the projecting sleeve and freely fitting one another, and means for securing such sections in adjusted positions.

In testimony whereof I have signed my name to this specification in the presence of two subscribing witnesses.

HUBERT KRANTZ.

Witnesses:
E. HOMAN,
J. A. NEWTON.